United States Patent [19]
Thompson et al.

[11] 3,805,842
[45] Apr. 23, 1974

[54] PINCH TUBE FAUCET

[75] Inventors: Arthur D. Thompson; Imao Kaibara, both of London, Ontario, Canada

[73] Assignee: Emco Limited, London, Ontario, Canada

[22] Filed: Jan. 15, 1973

[21] Appl. No.: 323,865

[52] U.S. Cl................... 137/636.4, 137/607, 251/7
[51] Int. Cl............................................. F16k 11/14
[58] Field of Search 137/602, 604, 609, 636.1–636.4, 137/607; 251/7, 9

[56] References Cited
UNITED STATES PATENTS

| | | | |
|---|---|---|---|
| 2,519,448 | 8/1950 | Fairchild | 137/636.1 |
| 2,985,192 | 5/1961 | Taylor et al. | 251/7 |
| 3,172,426 | 3/1965 | Cole | 137/636.4 |
| 3,411,534 | 11/1968 | Rose | 251/9 |
| 3,468,344 | 9/1969 | Sanford | 137/636.4 |
| 3,586,053 | 6/1971 | Browning | 137/636.4 |

*Primary Examiner*—Alan Cohan
*Assistant Examiner*—George L. Walton

[57] ABSTRACT

This invention relates to a faucet comprising a body having two inlet passages and one outlet passage, two flexible flow tubes mounted in said body, each of said two flexible flow tubes communicating on their downstream ends with said outlet passage, one of said two flexible flow tubes communicating at its upstream end with one of said inlet passages, the other of said flexible flow tubes communicating at its upstream end with the other of said inlet passages, two pairs of co-operating jaws, one pair for each of said two flexible flow tubes, each of said pairs of co-operating jaws embracing its respective flexible flow tube, and being adapted to open and close thereupon in a direction transverse to the direction of flow therethrough, a volume flow control means for operating said two pairs of co-operating jaws with respect to their respective flexible flow tubes to control the volume of liquid through said valve, mixture flow control means for operating said two pairs of co-operating jaws between open and closed positions under conditions of flow to proportion the flow between the said two flexible flow tubes, each of said pairs of jaws including a stationary jaw and a movable jaw, said mixture flow control means being responsive to manual operation to simultaneously operate the movable jaw of each of said pairs of co-operating jaws in opposite directions of opening from a position where one pair of jaws is open and the other pair of jaws closed through a position where each pair of jaws is equally open and to a position where the first pair of jaws is closed and the second pair of jaws is open.

2 Claims, 7 Drawing Figures

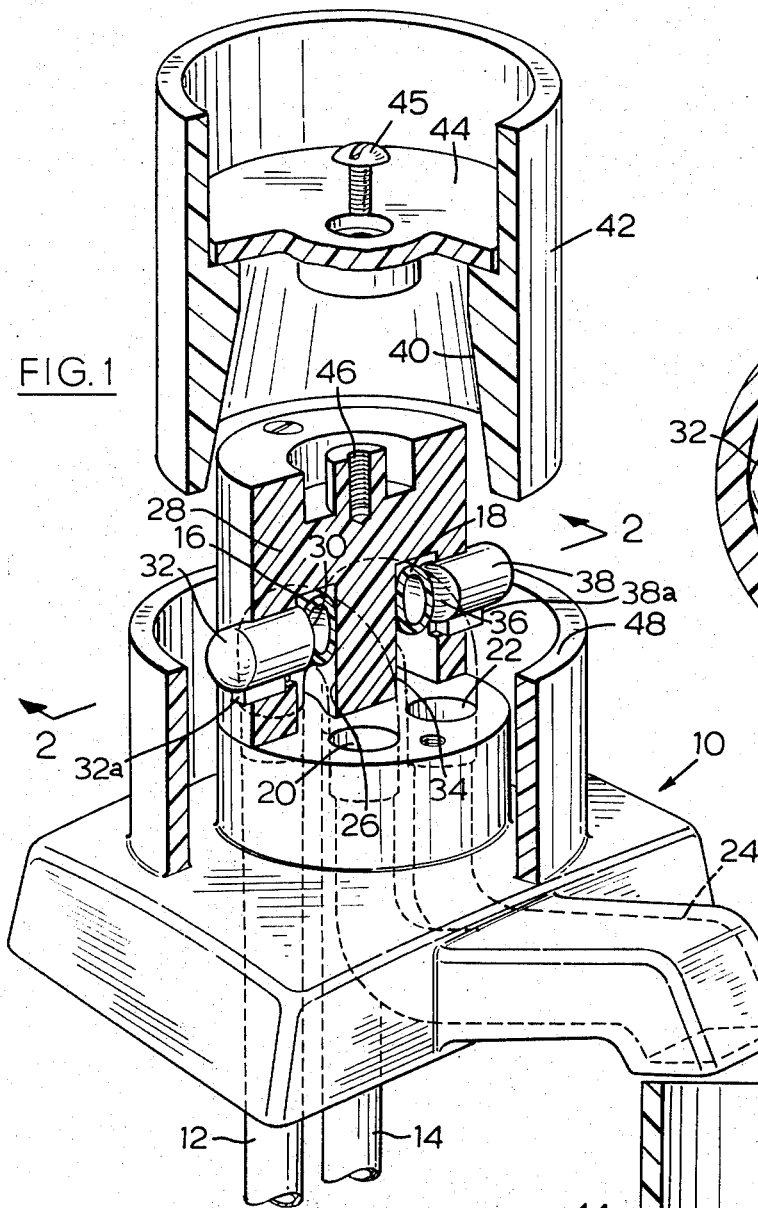
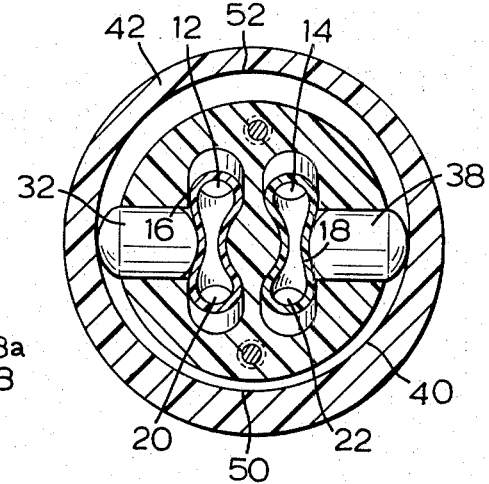
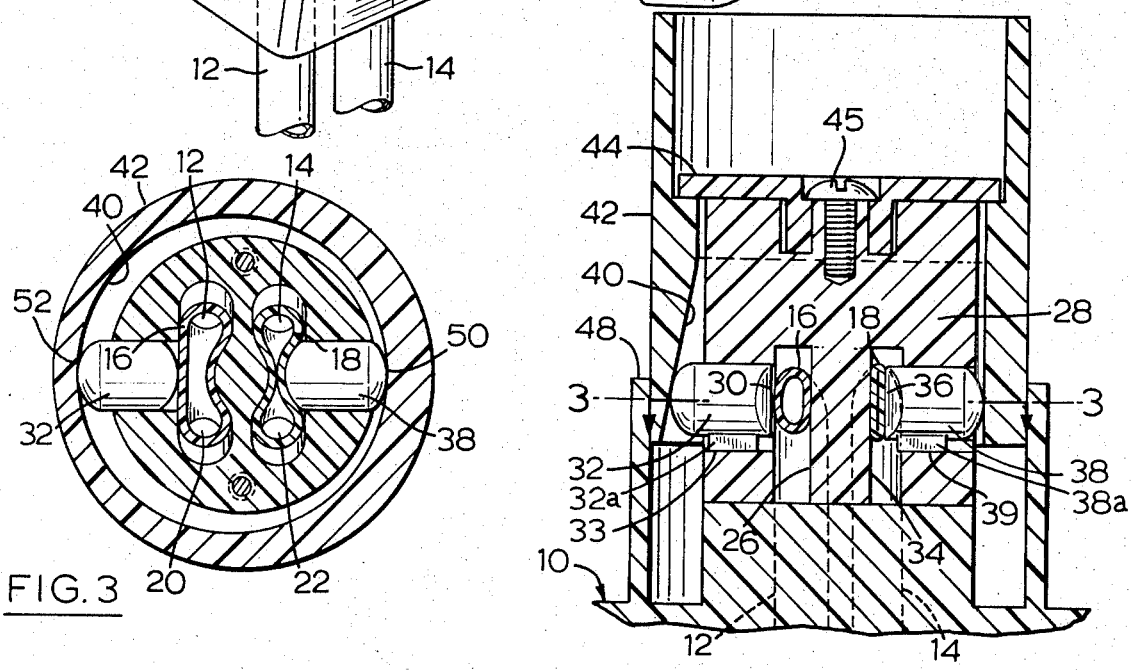
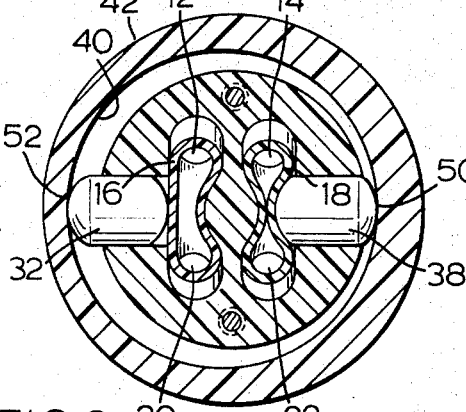

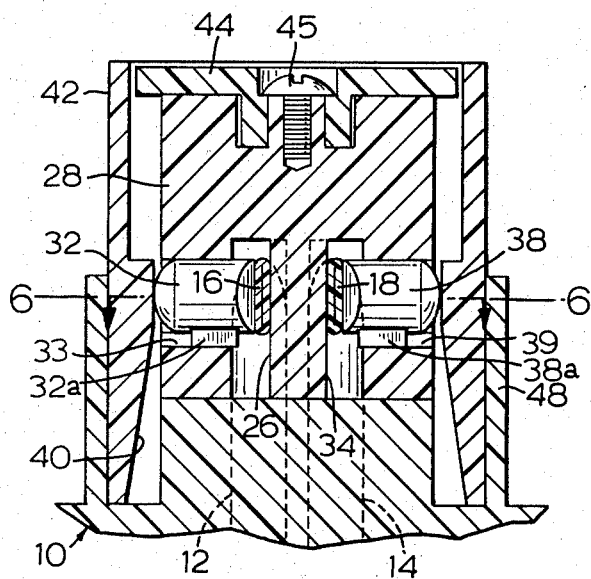
FIG. 5
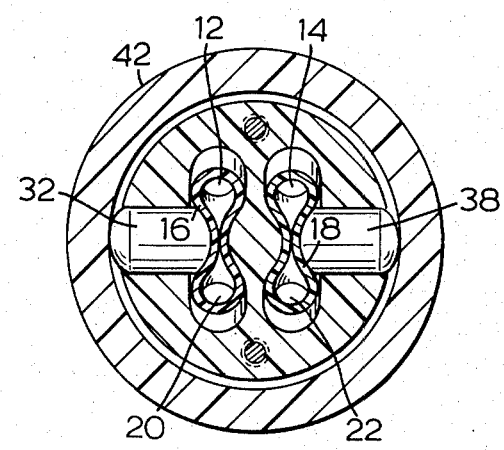
FIG. 6
FIG. 7

PINCH TUBE FAUCET

This invention relates to a mixing valve or faucet of the type having two inlet passages and one outlet passage. More particularly, it relates to a valve of this general type wherein the flow through the valve and the mixing of the flow from each of the two inlet passages is controlled by pinching flexible flow tubes through which the liquid flows.

Valves of this general type are known and a typical one is described in U.S. Pat. No. 3,172,426 to George S. Cole dated Mar. 9, 1965. In Cole, a spigot-like cam is mounted in the casing for movement of rotation and translation to project the cam surface between and against the flexible flow tubes for the purpose of achieving flow control and mixing.

It has been found that a more reliable pinch tube mixing faucet can be made if one arranges to pinch the flexible flow tubes by means of two pairs of cooperating jaws, one of which is stationary and the other of which moves. This design avoids the difficulties of cam and flow tube friction and avoids the difficulties of undue sloppiness with early wear.

Generally speaking, a valve according to this invention comprises a body having two inlet passages and one outlet passage, two flexible flow tubes mounted in said body, each of said two flexible flow tubes communicating on their down stream ends with said outlet passage, one of said two flexible flow tubes communicating at its upstream end with one of said inlet passages, the other of said flexible flow tubes communicating at its up-stream end with the other of said inlet passages, two pairs of co-operating jaws, one pair for each of said two flexible flow tubes, each of said pairs of co-operating jaws embracing its respective flow tube and being adapted to open and close thereupon in a direction transverse to the direction of flow therethrough, volume control means for operating said two pairs of co-operating jaws with respect to their respective flexible flow tubes to control the volume of liquid through said valve, mixture flow control means for operating said two pairs of cooperating jaws between open and closed positions under conditions of flow to proportion the flow between said two flexible flow tubes, each of said pairs of jaws including a stationary jaw and a movable jaw, said mixture flow control means being responsive to manual operation to simultaneously operate the movable jaw of each of said pairs of cooperating jaws in opposite directions of opening from a position where one pair of jaws is open and the other pair of jaws is closed through a position where each of the jaws is equally open and to a position where the first pair of jaws is closed and the second pair of jaws is open.

The invention will be clearly understood after reference to the following detailed specification read in conjunction with the drawings.

In the drawings:

FIG. 1 is an illustration of a valve faucet according to the present invention;

FIG. 2 is a partial section of a view along the line 2—2 of FIG. 1 with the flexible tubes in a different position;

FIG. 3 is a view along the line 3—3 of FIG. 2;

FIG. 4 is a view similar to FIG. 3 showing each of the flexible tubes in the partially opened position;

FIG. 5 is a view similar to FIG. 2 but showing the tubes in the fully closed position;

FIG. 6 is a view along the line 6—6 of FIG. 5; and

FIG. 7 is a sectional view of an alternative design illustrating a means for adjusting jaw dimensions.

The pinch tube proportioning valve illustrated in FIG. 1 has a body generally indicated by the numeral 10 that has mounted therein two inlet passages 12 and 14 for water. In use, one of the inlet passages carries hot water and the other inlet passage carries cold water. U-shaped flexible flow tubes 16 and 18 connect on their up-stream ends with inlet passages 12 and 14 respectively and on their down-stream ends with passages 20 and 22 respectively in the body of the valve. Passages 20 and 22 merge into the common outlet passage or spout 24.

It will be apparent that if a supply of hot water under pressure is connected to the inlet passage 12 and a supply of cold water under pressure is connected to the inlet passage 14 that flow of water through the valve and out of the spout 24 at variable volume and temperature can be achieved by regulating the flow through the two inlets. This is achieved in a pinch tube faucet by pinching the flexible tubes 16 and 18 to close or open them in varied amounts. Pinch tube faucets are not broadly new as indicated in the preamble to this specification, a notable one is described in U.S. Pat. No. 3,172,426 to Cole.

This invention is concerned with an improvement in a pinch tube faucet which in its broadest aspect relates to the manner of pinching the tubes 16 and 18 to control the flow therethrough. It has been found that if these tubes are each pinched between a pair of jaws, one of which is movable, that difficulties of friction and wear in a pinch tube faucet can be overcome.

In the embodiment of the invention illustrated, each of the pinch tubes 16 and 18 is controlled by a pair of cooperating jaws. Pinch tube 16 is embraced by a pair of jaws that consists of a rigid wall 26 of a tube retaining channel in the block 28 of the body 10, and the end face 30 of the cam follower pin 32. Similarly, tube 18 is embraced by a pair of co-operating jaws which includes the wall 34 of a tube retaining slot of the body block 28 and the face 36 of a cam follower pin 38.

Cam follower pins 32 and 38 reciprocate within tubular passages in the body block 28 and are adapted to follow the cam surface 40 of the depending skirt of the handle member 42. The end faces of the follower pins 32 and 38 are complementary to the surface of the block 28 with which they engage and keys 32a and 38a on pins 32 and 38 respectively are provided and in use operate in keyways 33 and 39 respectively to keep the pins from rotation. Handle member 42 is mounted for rotation with respect to the body 10 and is retained in position by means of the retaining disk 44 which is screw threaded to the block 28 as at 46. It will be apparent that handle 42 is free to rotate with respect to the body and with respect to the retaining plate 44. The handle 42 is also movable with a movement of translation with respect to the body block 28 and in this connection it can be reciprocated within the walls 48 of the body 10 downwardly from the position illustrated in FIG. 2 to the position illustrated in FIG. 5. Thus, the cam surface which is formed on the inside of the skirt of the handle 42 is movable with a movement of rotation and translation with respect to the body of the valve.

The cam followers 32 and 38 bear against the cam surface 40 that is formed on the inside of the skirted handle 42 and in use are maintained in contact with the cam surface by the resilience of the flexible flow tubes 16 and 18 and also by the pressure of the water or the like within the flow tubes.

The operation of the cam is illustrated in FIGS. 2 to 5 of the drawings. FIGS. 2 and 3 illustrate a rotational position of the cam 40 for establishing substantially full flow through the inlet tube 12 and no flow through the inlet tube 14. It will be noted that the cam surface 40 has a rise 50 and a fall 52 which are substantially 180° apart so that the rise 50 engages with the free end of cam follower pin 38 to force it inwardly to close off flexible tube 18 and the fall 52 permits the pin 32 to travel outwardly under the influence of the flexibility of the flexible tube and the water pressure within the tube to substantially its full extent and permit substantially full flow through the flexible tube 16.

The cam surface in cross-section has a gradual slope between the rise 50 and the fall 52 which is symmetrical on each side so that, by rotating the cam through 90° to a position illustrated in FIG. 4 pin 32 is gradually moved inwardly and pin 38 is permitted to move outwardly. Thus, in this position each of the tubes 16 and 18 are open and water flows through inlet 12 and inlet 14 to achieve an equal mixture of hot and cold water at the outlet spout 24. It will be apparent that any percentage mixture of the two can be achieved by rotation of the cam.

The cam is of varying transverse cross-sections, so that by moving the cam 40 longitudinally of itself it is possible to vary the total volume of flow for any given mixture of flow. The top of the cam surface is designed to depress each of the cam follower pins 32 and 38 so that their inner limits of travel in their slots fully close each of the flexible tubes 14 and 16 as illustrated in FIGS. 5 and 6 of the drawings.

FIG. 4 illustrates a position of the cam follower pins 32 and 38 which provides substantially uniform and full flow through each of the flow paths. By depressing the cam with respect to the block, the two cam followers each move inwardly the same amount to decrease the total flow through the faucet progressively as the cam is depressed until the position of FIGS. 5 and 6 is reached where both tubes are fully closed.

It will be apparent that one can achieve a control of volume by moving the cam 40 longitudinally of itself and a control of mixture of hot and cold water by rotating the cam.

The rigid jaws 26 and 34 of each of the pairs of jaws are in back-to-back relation and the movable jaw of each pair of jaws which consists of the faces 30 and 36 of the members 32 and 38 respectively moves from the outside in. This is an advantage in some constructions because it permits the moving parts to be mounted on the outside portion of the valve body where there is more room for mounting them. It would, for example, be difficult to provide for moving jaws in between the flow tubes.

The skirt shaped cam is a simple and reliable kind of movement with a relatively long cam surface and is therefore well adapted to a fine adjustment of water mixture and thereby temperature.

The skirt type cam with its associated cam followers avoids the rubbing and dragging action between cam and tube as the cam is twisted against the stationary tube, a simple jaw action that is easy on the tubes.

Moreover, should wear occur with the cam action of the present invention, it can be a relatively simple matter to provide for adjustment to correct for the wear and at the same time maintain good valve operation. FIG. 7 illustrates a construction wherein the back-to-back jaws 26 and 34 are adjustable in a lateral direction by means of wedging members of the turn buckle 60 that are movable in a vertical direction by means of adjusting screw 62. Other means for varying the maximum open distance of the jaws are possible; for example one could provide for an adjustment of the length of the members 32 and 38.

Arrangements of the invention including other camming arrangements to operate the movable jaws and including the nature of the cam follower, and including the means for adjusting the maximum distance of opening of said jaws than the ones illustrated are contemplated. The movable jaw, for example, could be welded to the tube. It is not intended that the foregoing description in these and other respects should be read in a limiting sense.

What we claim as our invention is:

1. A faucet comprising a body having two inlet passages and one outlet passage,
   two flexible flow tubes mounted in said body,
   each of said two flexible flow tubes communicating on their downstream ends with said outlet passage,
   one of said two flexible flow tubes communicating at its upstream end with one of said inlet passages,
   the other of said flexible flow tubes communicating at its upstream end with the other of said inlet passages,
   two pairs of cooperating jaws, one pair for each of said two flexible flow tubes, each of said pairs of cooperating jaws embracing its respective flexible flow tube, and being adapted to open and close thereupon in a direction transverse to the direction of flow therethrough,
   volume flow control means for operating said two pairs of cooperating jaws with respect to their respective flexible flow tubes to control the volume of liquid through said valve,
   mixture flow control means for operating said two pairs of cooperating jaws between open and closed positions under conditions of flow to proportion the flow between the said two flexible flow tubes,
   each of said pairs of jaws including a stationary jaw and a movable jaw, said mixture flow control means being responsive to manual operation to simultaneously operate the movable jaw of each of said pairs of cooperating jaws in opposite directions of opening from a position where one pair of jaws is open and the other pair of jaws closed through a position where each pair of jaws is equally open and to a position where the first pair of jaws is closed and the second pair of jaws is open, the position of the said stationary jaw of each of said pair of jaws being adjustable.

2. A faucet as claimed in claim 1 wherein said volume flow control means and said mixture flow control means includes a common cam element mounted for motion of rotation and translation with respect to said body and a cam follower for the movable jaw of each of the said pairs of jaws, the position of the said stationary jaw of each of said pair of jaws being adjustable.

* * * * *